(12) United States Patent
Adomaitis et al.

(10) Patent No.: US 9,908,708 B1
(45) Date of Patent: Mar. 6, 2018

(54) CONVEYOR BELT LINK WITH COUPLING MECHANISM

(71) Applicant: PRINCE CASTLE LLC, Carol Stream, IL (US)

(72) Inventors: Matthew Adomaitis, Aurora, IL (US); Frank Anthony Agnello, Huntley, IL (US); Richard Bauer, Palatine, IL (US); Eloy Cerda, Westchester, IL (US); Mark Edward Fastabend, Chicago, IL (US); Sean Patrick Forrest, Park Ridge, IL (US); Charles B. Hartfelder, Hanover Park, IL (US); Karl Ronald Heinze, Chicago, IL (US); Scott R. Hammac, Joliet, IL (US); Kyle Thomas Kestner, Schaumburg, IL (US); Christine S. Laub, Roselle, IL (US); Eugene Stanley Maslana, Morton Grove, IL (US); Calvin States Nelson, Round Lake Beach, IL (US); Laurence A. Schoell, Shorewood, IL (US); Zoran Ulicevic, Wheaton, IL (US); Aleksandr Yazvin, Glenview, IL (US); Loren J. Veltrop, Chicago, IL (US); Brian J. Truesdale, Carol Stream, IL (US); Dennis Malkowski, Yorkville, IL (US)

(73) Assignee: PRINCE CASTLE LLC, Carol Stream, IL (US)

(\*) Notice: Subject to any disclaimer, the term of this patent is extended or adjusted under 35 U.S.C. 154(b) by 0 days.

(21) Appl. No.: 15/154,932

(22) Filed: May 13, 2016

Related U.S. Application Data

(60) Provisional application No. 62/161,236, filed on May 13, 2015.

(51) Int. Cl.
*B65G 17/40* (2006.01)
*A21B 1/42* (2006.01)
*B65G 23/06* (2006.01)
*B65G 17/08* (2006.01)

(52) U.S. Cl.
CPC .................................. *B65G 17/08* (2013.01)

(58) Field of Classification Search
CPC ............ B65G 17/40; B65G 23/06; A21B 1/42
USPC ........................................ 198/731, 850, 851
See application file for complete search history.

(56) References Cited

U.S. PATENT DOCUMENTS

| 2,987,167 | A | | 6/1961 | Franz | |
|---|---|---|---|---|---|
| 4,394,901 | A | * | 7/1983 | Roinestad | B65G 17/068 198/850 |
| 4,473,365 | A | * | 9/1984 | Lapeyre | B65G 17/08 198/850 |
| 5,307,923 | A | | 5/1994 | Damkjaer | |

(Continued)

FOREIGN PATENT DOCUMENTS

JP H06-141985 A 5/1994

*Primary Examiner* — Douglas Hess
(74) *Attorney, Agent, or Firm* — Marshall, Gerstein & Borun LLP

(57) ABSTRACT

The present invention is directed to a conveyor belt link and a sprocket driven conveyor belt comprising the same. In particular, it relates to a conveyor belt link with coupling mechanism that provides a conveyor belt surface that can reduce product marking, minimizes costs, and simplifies manufacturing and assembly of a conveyor belt comprising the same.

8 Claims, 12 Drawing Sheets

(56) References Cited

U.S. PATENT DOCUMENTS

| | | | |
|---|---|---|---|
| 6,223,889 B1 | 5/2001 | Layne et al. | |
| 6,581,758 B1 | 6/2003 | van-Zijderveld et al. | |
| 6,918,486 B2 | 7/2005 | Shibayama et al. | |
| 7,278,535 B2 * | 10/2007 | Damkj.ae butted.r | B65G 17/08 198/850 |
| 7,314,132 B2 * | 1/2008 | Layne | B65G 17/40 198/850 |
| 7,419,051 B2 | 9/2008 | Damkj.ae butted.r | |
| 7,530,455 B2 | 5/2009 | Lucchi | |
| 7,708,135 B2 | 5/2010 | Ellerth et al. | |
| 7,721,877 B2 | 5/2010 | Maine, Jr. et al. | |
| 7,800,023 B2 | 9/2010 | Burtea et al. | |
| 7,878,323 B2 * | 2/2011 | Van Rees | B65G 17/08 198/841 |
| 7,975,840 B2 | 7/2011 | Messick, Jr. et al. | |
| 7,987,972 B2 | 8/2011 | Hennigar et al. | |
| 8,113,340 B1 * | 2/2012 | Smith | B65G 17/08 198/850 |
| 8,499,928 B1 | 8/2013 | Liao et al. | |
| 8,506,687 B2 | 8/2013 | Jones | |
| 8,752,698 B2 | 6/2014 | Lasecki et al. | |
| 8,863,944 B2 | 10/2014 | MacLachlan | |
| 8,939,279 B2 * | 1/2015 | Porter | B65G 15/30 198/779 |
| 9,073,694 B2 * | 7/2015 | Ozaki | B65G 15/30 |
| 9,221,611 B2 | 12/2015 | Ulchak et al. | |
| 2010/0275789 A1 | 11/2010 | Lee et al. | |
| 2015/0129395 A1 | 5/2015 | Messick, Jr. | |
| 2015/0151919 A1 | 6/2015 | Messick, Jr. et al. | |
| 2015/0191312 A1 | 7/2015 | Ulchak et al. | |
| 2016/0185529 A1 | 6/2016 | Bauer | |
| 2016/0185530 A1 | 6/2016 | Malkowski et al. | |

* cited by examiner

CONVEYOR BELT LINK WITH COUPLING MECHANISM

CROSS REFERENCE TO RELATED APPLICATION

This application claims the benefit under 35 U.S.C. § 119(e) of U.S. provisional patent application Ser. No. 62/161,236, filed May 13, 2015, the entire disclosure of which is incorporated herein by reference, is hereby claimed.

FIELD OF THE INVENTION

The present invention is directed to a conveyor belt link and a sprocket driven conveyor belt comprising the same. In particular, it relates to a conveyor belt link with coupling mechanism that provides a conveyor belt surface that can reduce product marking, minimizes costs, and simplifies manufacturing and assembly of a conveyor belt comprising the same.

BACKGROUND OF THE INVENTION

Conveyor belts have been known for many years, and are commonly used in many different fields of technology. Conveyor belts convey different items for cooling, drying, coating, cooking, and many other applications. Different types of conveyor belts include mesh belts, balanced weave belts, and wire belts.

Wire conveyor belts provide a more simple design than mesh and balanced weave belts. Wire conveyor belts are used for material handling, cooking, icing, slicing, breading, cooling, filling, inspecting, and packing of products like breads, rolls, buns, donuts, confections, cakes, pies, pastries, meat, seafood, poultry, and various processed products. They are also excellent for light-duty applications in metalworking and other industries. The open design of a conventional wire conveyor belt provides efficient operation with minimum maintenance and easy cleanup to meet sanitation requirements. A wire conveyor belt generally comprises a plurality of spaced metal rods interconnected by a plurality of "knuckle" connection elements formed at the rod ends. Some wire conveyor belts have sheet metal slats attached to the rods, for example, the wire conveyor belt disclosed in U.S. Pat. No. 7,987,972, which is herein incorporated by reference in its entirety.

Wire conveyor belts, however, often create a number of problems in the food industry in particular. It has been found, for example, that in some instances the rods of a wire conveyor belt can leave a mark on a bottom surface of a food product that "runs" on top of the belt. The markings may become even more prominent if the product is heated while it is on the belt, if the product is put under pressure, or if the product being conveyed is naturally soft or pliable. Since product appearance is important for gaining consumer acceptance, particularly when food products are involved, the resulting markings can be a barrier to the use of a wire conveyor belt to carry certain products. The rods of the wire conveyor belts are also smooth and do not substantially grip or retain items that have smooth or slippery surfaces. Additionally, the components of the aforementioned wire conveyor belts, e.g., metal rods, knuckle connection elements, and metal slats affixed to the metal rods, require multiple manufacturing technologies. The manufacturing of multiple, different components as well as assembling the multiple components of the conveyor belt adds to the overall cost and complication of wire conveyor belt production. Accordingly, there exists a need in the marketplace for a conveyor belt that is simple to manufacture and assemble and can grip items with smooth or slippery surfaces without leaving marks on food products.

DETAILED DESCRIPTION

Figure 1:
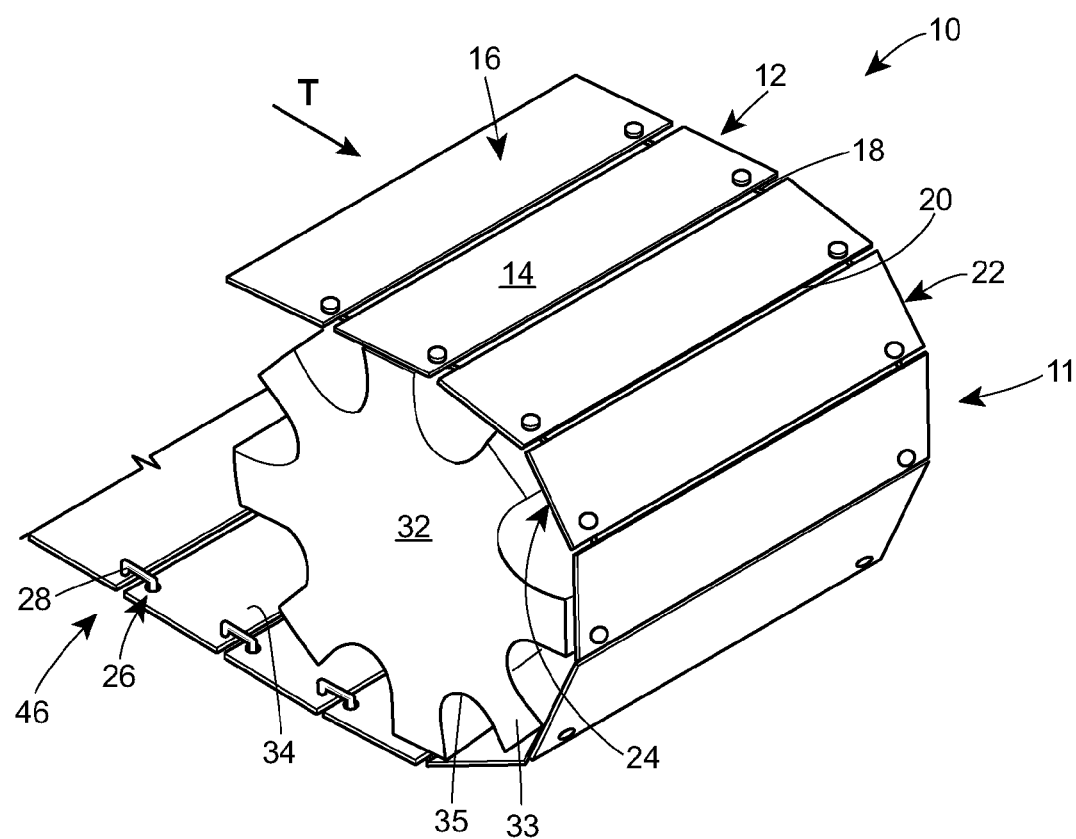
FIG. 1 illustrates a conveyor belt assembly according to an embodiment of the disclosure.

A conveyor belt link that can form a flat, continuous conveyor belt when coupled with multiple, identical conveyor belt links is disclosed. A conveyor belt assembly 10 according to the disclosure is generally and partially illustrated in FIG. 1. A conveyor belt 12 includes a plurality of links connected in succession to form a complete belt (not shown). Each link 14 has a base 16 for carrying an item, the base further includes first and second opposing sides 18, 20 that have axes that are perpendicular to a direction of travel. In examples described below, the base also has opposing side edges 22, 24 that have axes that are parallel to the direction of conveyance travel. In the exemplary embodiment illustrated in FIG. 1, a female part 26 is formed in the first opposing side 18 and a corresponding male part 28 capable of releasably coupling with the female part 26 projects from the second opposing side 20. That is, the female part 26 of the link 14 is adapted to releasably receive a male part 28 of a directly adjacent second link 14 of the plurality of links. In other embodiments, however, the female part 26 may be formed in the second opposing side 20, and the corresponding male part 28 projects from the first opposing side 18 of a directly adjacent second link.

The female part 26 of a first link 14 couples to a male part 28 of a second link 14, and the male part 28 of the first link 14 couples to a female part 26 of a third link 14, with both the second and third links 14 being directly adjacent to the first link 14 such that the first, second, and third links 14 are connected in succession with the second and third links 14 being disposed at the first and second opposing sides 18, 20 of the first link 14. Once the female part 26 of the first link 14 couples to the male part 26 of the adjacent link 14, the two links are locked via a coupling mechanism 46. The coupling mechanism 46, which comes in various embodiments described herein, keeps the adjacent links coupled and may be unlocked such that adjacent, connected links may be uncoupled from one another, as described further below. The female part 26 is adapted to be rotatably coupled to the male part 28 of an adjacent conveyor belt link. Specifically, the male part 28 of a first link 14 may be slidably received by the female part 26 of a second identical link 14. In preferred embodiments, the female part 26 of a first conveyor belt link 14 is rotatably and releasably coupled to the male part 28 of an adjacent conveyor belt link 14.

As used herein, the term "rotatably coupled" refers to two elements that are hingedly coupled, i.e., the two elements are capable of partial rotation relative to one another about a common axis of rotation. As used herein, the term "releasably coupled" refers to two interconnected elements that can be decoupled from one another without causing damage or dysfunction to the respective elements.

So configured, and as illustrated in FIG. 1, the male and female parts 26, 28 of adjacent links couple and lock together and the base 16 of the first link 14 and a base 16 of the second link 14 substantially mate to form a continuous and substantially flat conveyor belt 12. The bases 16 of the plurality of links form a surface for conveying a food product, or other item, for a given distance of the conveyor belt. The coupled male and female parts 28, 26 are hingedly coupled when interconnected.

The disclosed conveyor belt may be driven by any of a variety of driving mechanisms that engage the plurality of links and rotate the links around a conveyor loop 11. At one end of the conveyor belt, the food product or item is received, the food item then travels across the length of the conveyor belt, and is deposited at the end of the loop 11 where the links rotate about a driving mechanism. The driving mechanism 32 of FIG. 1, is a sprocket, for example. The links may provide an aperture, protrusion, or other driving surface that enables a driving mechanism to engage or grip the links. For example, in one embodiment, the adjacent conveyor belt links may form a protrusion or alternatively provide a aperture that maybe be gripped or engaged by a sprocket, a gear, or other driving mechanism. As illustrated in FIG. 1, the male part 28 protrudes from a bottom surface 34 of the link 14. In this case, although not shown, the male part 28 may be gripped or engaged by a tooth 33 of the sprocket 32 and may be utilized by the sprocket 32 to drive and rotate the link 14 and thereby drive the conveyor belt 12. In another example, not shown, the link 14 may have an aperture (not shown) defined in the base 16 thereof that can receive a tooth of the sprocket 32 as the link 14 rotates about the sprocket 32 and then uncouples once the link 14 has been rotated about the gear or driving mechanism such that the link 14 is traveling on the return side of the conveyor belt 12. The driving mechanism 32 is discussed further below.

Figure 2:
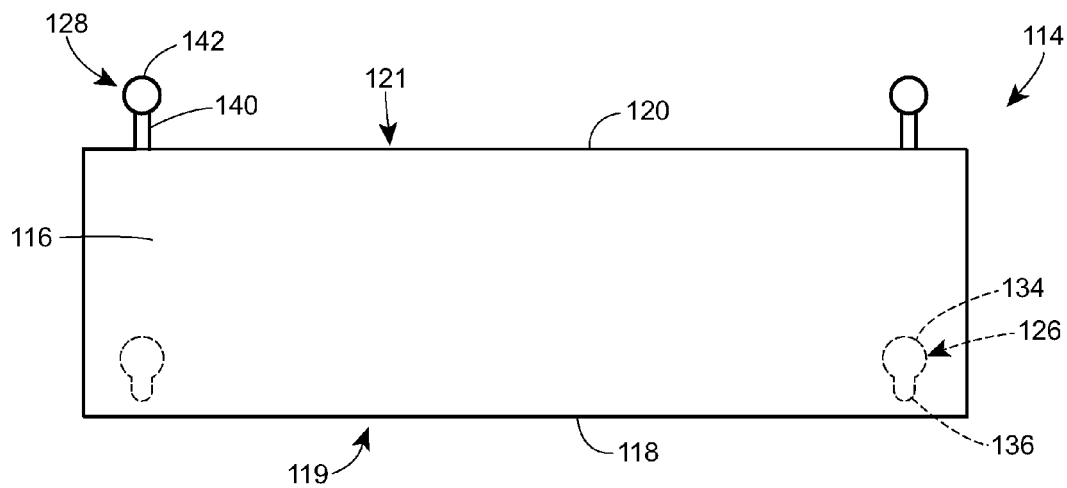
FIG. 2 is a top view illustrating a conveyor belt link according to an embodiment of the disclosure.

Turning to the first embodiment of the conveyor belt link, FIG. 2 illustrates a top view of a conveyor belt link 114 having a first opposing side 118 and a second opposing side 120. The first opposing side 118 is a leading edge 119 of the link 114 relative to a direction of conveyance travel T of the conveyor belt 12. In other words, the first opposing side 118 is in front of the second opposing side 120 in the direction of conveyance travel T and is engaged by a driving mechanism (not shown) before the second opposing side 120, where the second opposing side is a trailing edge 121. The leading and trailing edges 119, 121 are perpendicular to the direction of conveyance travel T of the conveyor belt 12. In another embodiment, the direction of conveyance travel T is reversed relative to the direction shown in FIG. 1, and the first opposing side 18 may be the trailing edge and the second opposing side 20 may be the leading edge.

Figure 3A:
FIG. 3A further illustrates the conveyor belt link of FIG. 2.
Figure 3B:
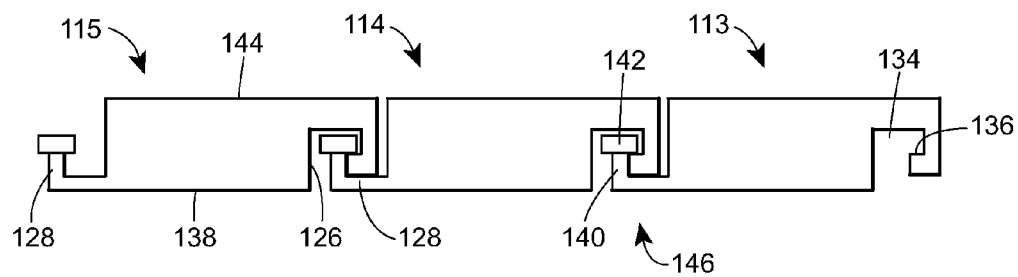
FIG. 3B illustrates a plurality of coupled conveyor belt links of FIG. 2.

Illustrated in FIGS. 2, 3A, and 3B, the male part of the coupling mechanism of the first embodiment comprises a simple key and the female part comprises a corresponding key slot adapted to receive the key. The female part 126 is formed in the first opposing side 118, which is also the leading edge 119. In general, the female part 126 is a key slot with a head portion 134 located away from the leading edge 119 and a smaller round neck portion 136 located closer to the leading edge 119. In the embodiment shown in FIG. 3A, the female part/key slot 126 is provided by a cavity defined in a bottom surface 138 of the conveyor belt link 114, with the cavity being enclosed in part by a top surface 144 of the conveyor belt link 114.

The male part 128 protrudes from the second opposing end 120, forming an arm 140 with a round key head 142. FIG. 3B illustrates the conveyor belt link 114 of FIG. 2 coupled to first and second, adjacent conveyor belt links 115, 113 to form a substantially flat and continuous surface. In the illustrated example, the female and male parts 126, 128 of the first link 114 lock with the respective male part 128 of the second adjacent link 113 and the respective female part 126 of the first adjacent link 115. A key head 142 of an arm 140 of the second adjacent link 113 enters the head portion 134 of the key slot 126 from the bottom side 138 of link 114, extends vertically through the head portion 134, and slides horizontally toward the leading edge 119 of the first link 114 such that the arm 140 slides into the neck portion 136 of the key slot 126. Once the arm 140 slides into the neck portion 136 of the key slot 126, the key head 142 of the male part 128 of the second adjacent link 113 is locked in tension with the key slot 136 of the link 114. To disengage the coupling mechanism, the adjacent links 114, 115 are pushed together, thereby moving the arm 128 away from the neck portion 136 of the key slot 126 into the head portion 134, and allowing the key head 142 to traverse through the head portion 134 of the key slot 126 such that the male part 128 of link 113 is disengaged from the female part 126 of link 114.

Figure 4:
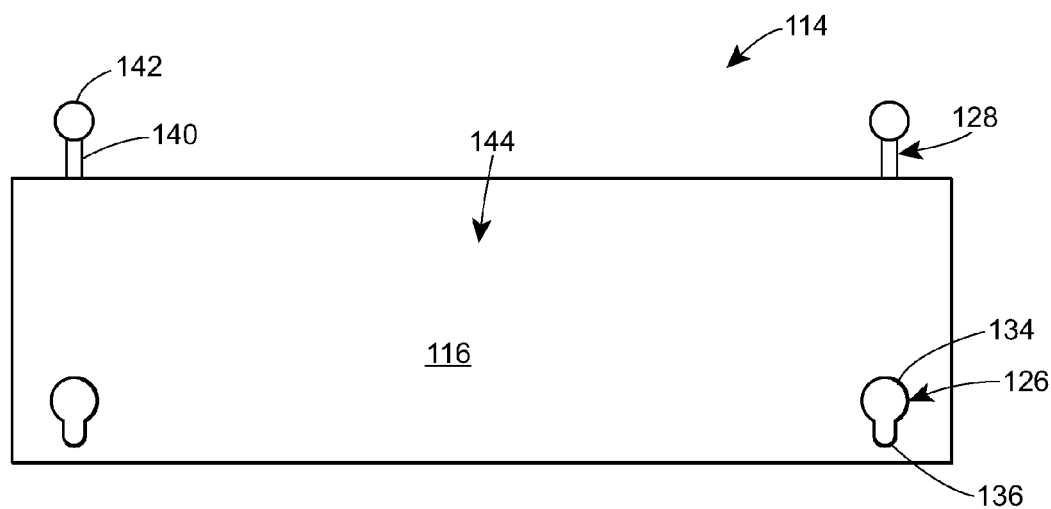
FIG. 4 is a top view illustrating another embodiment of a conveyor belt link according to the disclosure.

The male and female parts 126, 128 of a conveyor belt link according to the disclosure may be configured differently than as illustrated in the conveyor belt links shown in FIGS. 2-3B. For example, in another embodiment illustrated in FIG. 4, the female part 126 is provided by a bore in the shape of a key slot formed in both a top surface 144 and the bottom surface 138 of the link 114, such that the key slot-shaped bore traverses from the top surface 144 through the entire thickness of the link to the bottom surface 138. FIG. 4 is a top view of the link 114 with a key slot-shaped bore 126 that extends from the top surface 144 through to the bottom surface 138 of the link 114, as illustrated in the side view of two coupled links illustrated in FIG. 5. In such an embodiment, the corresponding male part 128 must also traverse through the entire thickness of the link 114 when engaging/coupling to the female part 126 of an adjacent link.

Figure 5:
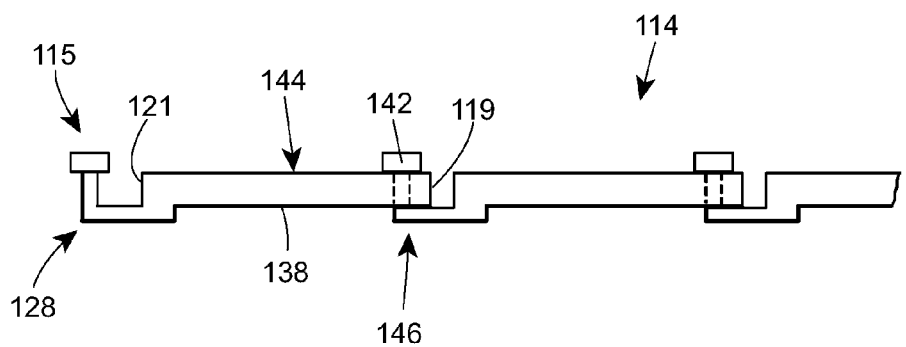
FIG. 5 illustrates coupled conveyor belt links of FIG. 4.
Figure 6:
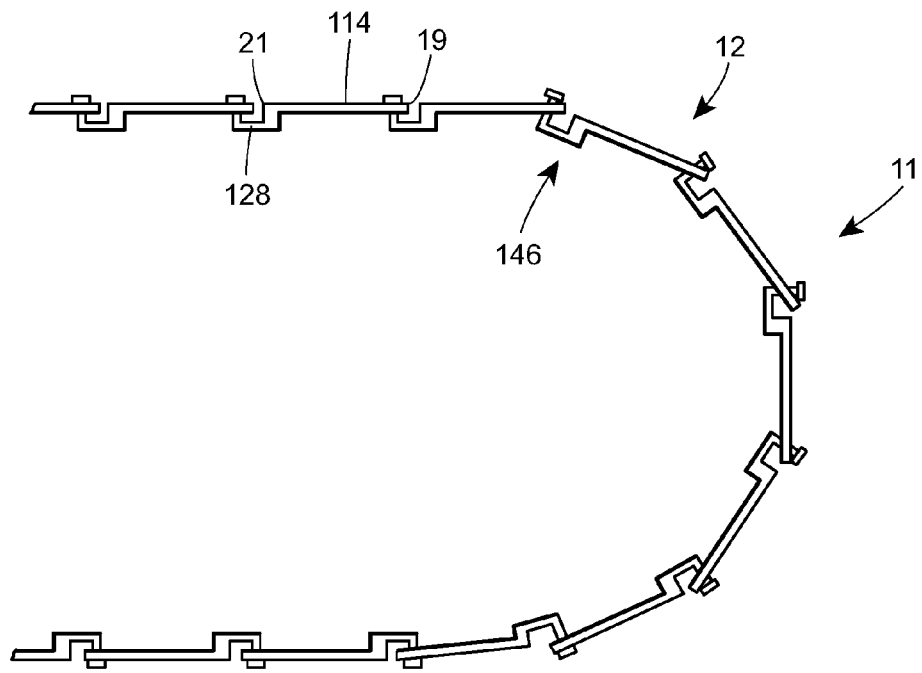
FIG. 6 is a side view illustrating a partial conveyor belt comprising a plurality of coupled conveyor belt links of FIG. 4.

As illustrated in FIG. 5, the link 114 of FIG. 4 is coupled to an identical, adjacent link 115 to form a continuous surface. To lock or couple adjacent links, a key head 142 of the male part 128 of the second link 115 enters the key slot 126 in the bottom surface 138 of the first link 114 through the head portion 134, extends vertically through the first link 114, and slides toward the leading edge 119 of the first link 114 such that an arm 140 of the male part 128 of the second link 115 engages the neck portion 136 of the key slot 126 of the link 114. The key head 142 of the male part 128 of the second link 115 rests on the top surface 144 of the first link 114 when the first and second links 114, 115 are coupled. FIG. 6 is a side view of a partial conveyor belt 12 having a plurality of conveyor belt links of FIG. 4. The male part 128 of the coupling mechanism 146 can protrude from a bottom surface 138 of the link 114 such that it may be gripped or engaged by a tooth of a sprocket and thereby utilized by the sprocket to drive and rotate the link 114 and thereby drive the conveyor belt 112.

Figure 7:
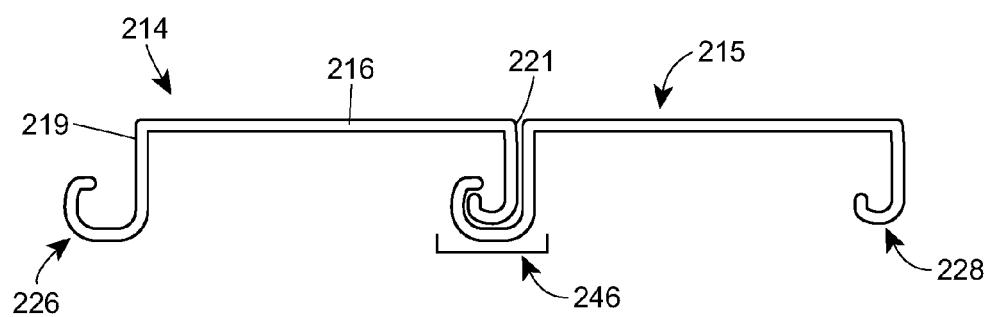
FIG. 7 is a side view illustrating another embodiment of a conveyor belt link according to the disclosure.

FIG. 7 is a side view of another embodiment of a conveyor belt link 214 having a coupling mechanism 246 that allows adjacent links 214, 215 to rotatably couple to one another. In this embodiment, rather than being formed within the link itself (e.g., within the base of the link), a female part 226 projects downward from a trailing edge 219 of the base 216 of the link 114 and curves away from the base 216 to form a hook, or a channel, for receiving a corresponding male part 228. The male part 228 projects downward from a leading edge 221 of the base 216 of a second adjacent conveyor belt link 214 and curves inward toward the base 216 (of the second adjacent link 214), forming a hook, or channel, which is smaller relative to the hook/channel of the female part 226. FIG. 7 also illustrates the second, identical adjacent link 215 being rotatably coupled to the first link 214. The two links form a coupling 246 where a female part 226 of an immediately adjacent link 215 receives and encloses the male part 228 of the first link 214. The two links form the coupling 246 by sliding the male part 228 of the first link 214 into the female part 226 of the second link 215. In order to couple three (or more) consecutive links 214, couplings 246 are located at opposing ends of a central link. In general, the female and male parts 226, 228 may run the entire length of the trailing and leading edges 219, 221 of the links to form the female channel and the male channel, or alternatively, these structures may only be provided on sections of the trailing and leading edges. Although the male part 228 is shown as projecting from the leading edge 221 and the female part 226 is shown as projecting from the trailing edge 219, in an alternative embodiment, the male part 228 can project from the trailing edge 219 and the female part 226 can project from the leading edge 221.

Figure 8:
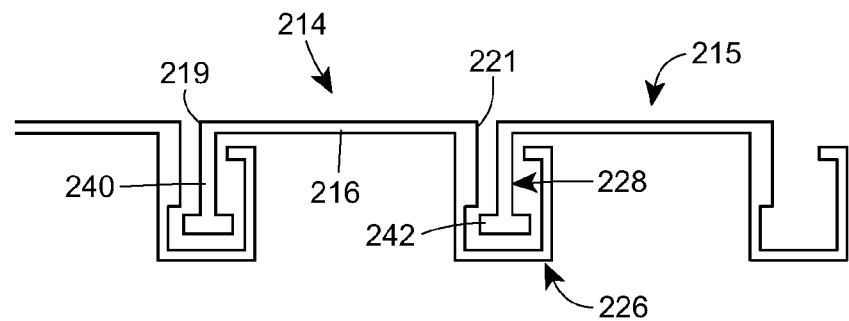
FIG. 8 is a side view illustrating another embodiment of a conveyor belt link according to the disclosure.

Similarly, FIG. 8 illustrates another embodiment including a first link 214 rotatably coupled to a second, adjacent link 215. In this embodiment, a female part 226 of the first link 214 projects from a leading edge 221 of the base 216 of the first link 214, and a male part 228 projects from a trailing edge 219 of the base 216 of the first link 214. The male part 226 includes a vertical arm 240 with a head 242 at a distal end of the arm 240, and the female part 226 comprises a U-shaped arm, or channel, that can receive the corresponding male part 228. The male part 228 is received by the female part 226, for example, by sliding the male part of one link 214 into the female part 226 of an adjacent link. The female part 226 provides enough clearance for the male part 228 to rotate when the coupled links rotate about a driving mechanism. FIG. 8 illustrates the female part 226 of the first link 214 coupled to the male part 228 of the second link 215. Although the male part 228 is shown as projecting from the trailing edge 219 and the female part 226 is shown as projecting from the leading edge 221, in an alternative embodiment, the male part 228 can project from the leading edge 221 and the female part 226 can project from the trailing edge 219.

Figure 9:
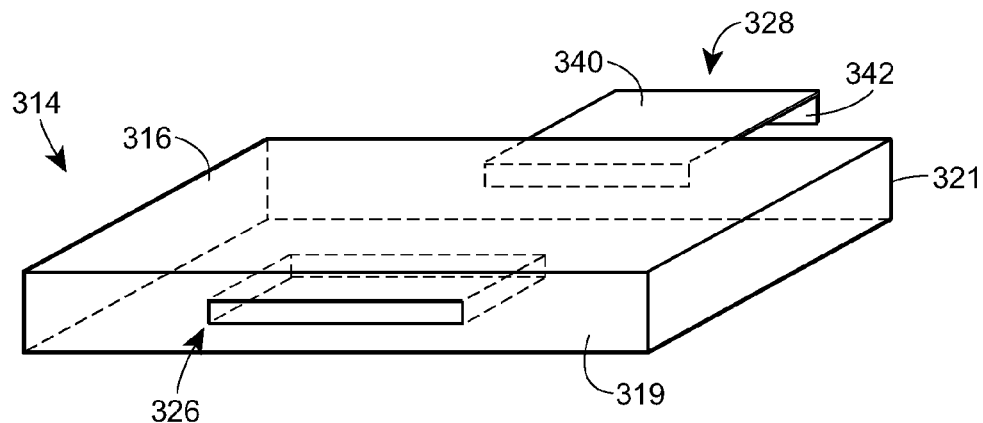
FIG. 9 is a perspective view illustrating another embodiment of a conveyor belt link according to the disclosure.

In another embodiment, FIG. 9 illustrates a perspective view of a link 314 having yet another coupling mechanism. In this example, a female part 326 provides an opening at a leading edge 319 of the base 316 of the link 314 and a corresponding male part 328 protrudes from a trailing edge 321 of the base 316 of the link 314. The male part 328 includes a tab 340 and a clip 342 formed at a distal end of the tab 340, and is configured to hook onto, or grip, an inside surface (shown in dashed-lines) of the female part 326. Thus, the opening is able to receive the corresponding male part 328. The opening of the female part 326 provides a thin clearance that allows the clip 342 of the male part of an adjacent link to be inserted into the opening. To insert the clip 342 into the opening, the link 314 is oriented so that the clip 342 is approximately parallel to the base 316. Once the clip 342 is inside the opening, the link 314 can be rotated so that the tab 340 is parallel to the base 316 and can slide into the opening. The clip 342 has a width that is slightly wider than a width of the female part 326 so that when two links 314 couple (not shown), the clip 342 prevents the male part 328 of one link 314 from sliding out of the female part 326 of the other link 314. The links 314 are thereby locked in tension, and may be released by pushing the links together and unhooking the male part 328 from the female opening 326 by partially rotating the link 314 so that the clip 342 is parallel with the base 316 and can slide out of the female part 326. Although the male part 228 is shown as projecting from the trailing edge 219 and the female part 226 is shown as projecting from the leading edge 221, in an alternative embodiment, the male part 228 can project from the leading edge 221 and the female part 226 can project from the trailing edge 219.

Figure 10:
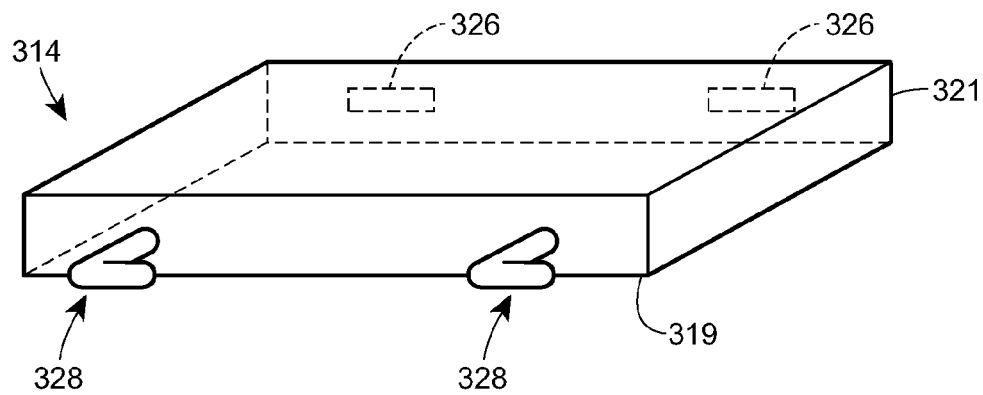
FIG. 10 is a perspective view illustrating a further embodiment of a conveyor belt link according to the disclosure.

Similarly, another embodiment illustrated in FIG. 10 depicts a perspective view of a link 314 having two male parts 328 protruding from a leading edge 319 and a female part 326 formed within a trailing edge 321. The male parts 328 of FIG. 10 comprise L-shaped hooks, but may take the form of other protruding structures, such as a hook, clip, clamp, etc. that can couple to a corresponding female part. Along the same lines, the female parts 326 of FIG. 10 comprise apertures adapted to receive the L-shaped hook, but may take the form of any opening capable of receiving the male part (or parts). In the illustrated example, when coupling two links 314, the female parts 326 of a first link 314 are initially located a distance offset from the L-shaped hooks 328 of a second link 314 so that when the L-shaped hooks 328 first enter the female parts 326, the adjacent link (not shown) is misaligned by the offset distance. The L-shaped hooks 328 and the female parts 326 couple (not shown) when the link 314 shifts so that the coupled links 314 are fully aligned, causing the L-shaped hook to engage an inside surface of the female part 326.

Figure 11:
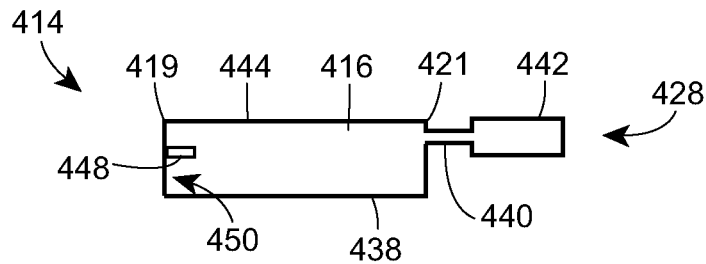
FIG. 11 is a cross-sectional side view illustrating another embodiment of a conveyor belt link according to the disclosure.
Figure 12:
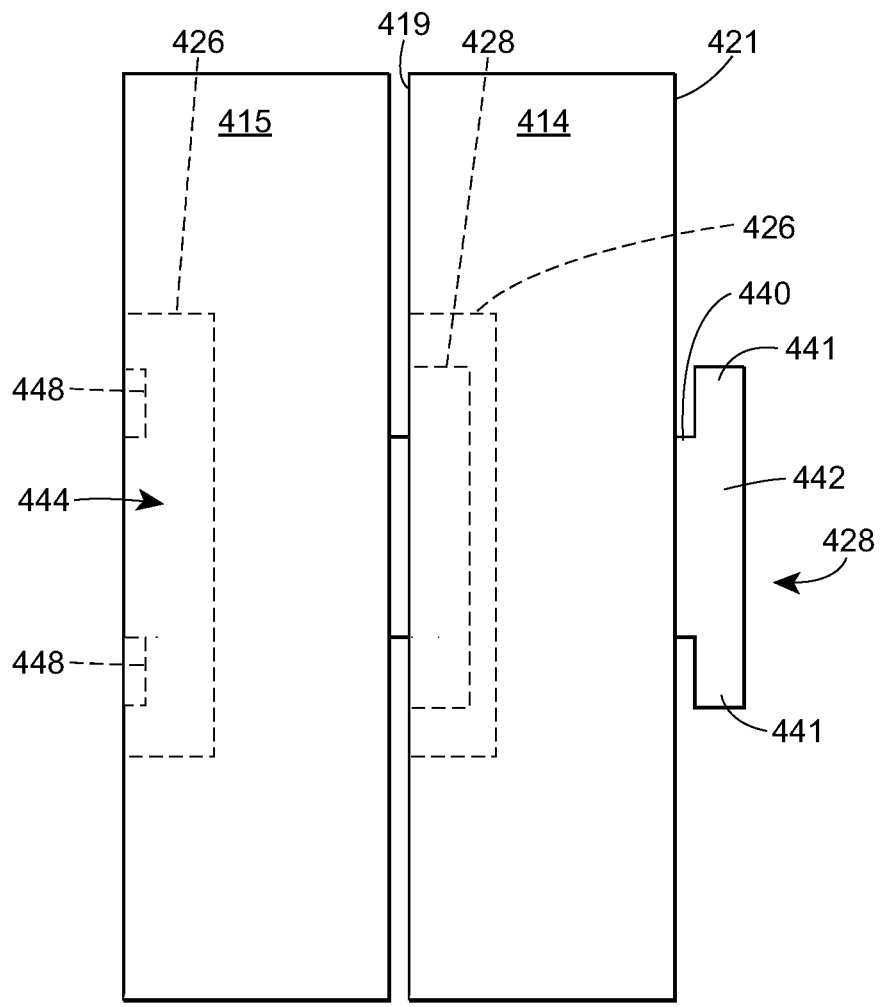
FIG. 12 is a top view of illustrating another embodiment of a conveyor belt link according to the disclosure.
Figure 13:
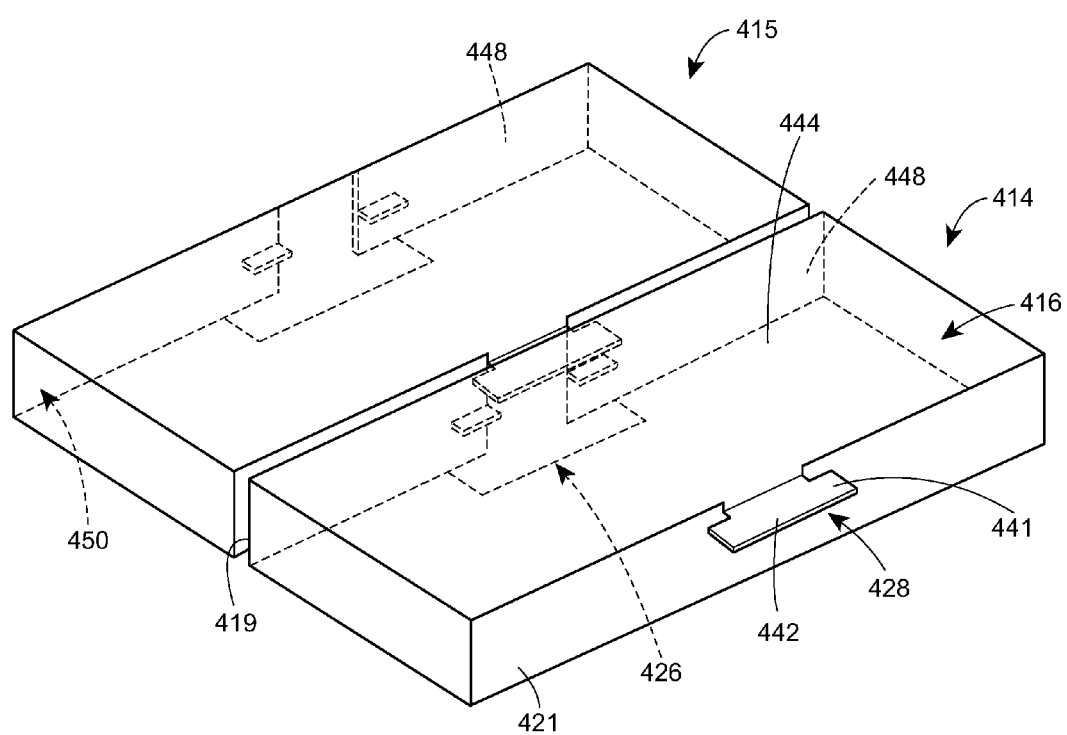
FIG. 13 is a perspective view further illustrating the conveyor belt link of FIG. 12.

FIG. 11 illustrates a cross-sectional side view of another embodiment of a conveyor belt link 414 capable of coupling with an identical link. The link 414 has a female part 426 (not apparent in FIG. 11) formed in a trailing edge 419 of a base 416 and a male part 428 formed in a leading edge 421 of the base 416. The male part 428, best illustrated in FIGS. 12-13, comprises a neck portion 440 and a head 442 protruding from the neck 440, the head including a first flange 441 and a second flange 441. The neck 440 can be disposed between a top surface 444 and a bottom surface 438, e.g., at a relatively short distance from the top surface 444 of the base 416 so that the coupled links form a relatively flat surface, as illustrated in FIGS. 12 and 13. FIG. 12 illustrates a top view of two identical links 414, 415, where a female part 426 (illustrated by the dotted line) of a first link 414 is coupled to a male part 428 (illustrated by the dotted line) of a second link 415. As shown in the perspective view of the link 414 illustrated in FIG. 13, the female part 426 (represented by the dotted line) is formed in a bottom surface 438 of the base 416 and in the trailing edge 419 of the first link 414. The female part 426 is an opening having a first width along the trailing edge 419 and a second width along the bottom surface 438 of the link 414, 415, with the first width being smaller than the second width. In the illustrated embodiment, the opening of the female part 426 takes the form of an inverted T-shaped slot when directly adjacent links 414, 415 are coupled to one another. A shelf 448 located in an interior of the female part 426 along an inner surface 450 of the trailing edge 419 protrudes slightly from the trailing edge 419 toward the center of the link 414. The shelf 448 provides a rest or a stop for the flanges 441 of the head 442 of the male part 428 when two directly adjacent links are coupled. The male part 428 of the second link 415 couples and locks to the adjacent link 414 by sliding vertically through the opening 426 in the bottom surface 438 of the first link 414 until it is slightly above a height of the shelf 448. The flanges 441 of the male part 428 protrude on either side of the opening 428 in the leading edge 419 of the first link 414 so that when the links are in tension, the flanges 441 of the male part 428 of the second link 415 abut against the inner surface 450 of the leading edge 419 of the first link 414 and rest on the shelf 448. To disengage the female and male parts 426, 428, the links are pushed together so that the flanges 441 move away from the shelf 448 and the inner surface 450 of the leading edge 419 and are free to traverse through the opening 428 in the bottom surface 438 of the first link 414. In another embodiment not shown, the coupling mechanism between the male and female parts may be a bayonet lock, or a lock of similar structure.

In other embodiments, the coupling mechanism may take the form of a bayonet lock (not shown). In such a bayonet mechanism, the male part 428 comprises a radial pin, and the female part 426 comprises an L-shaped slot. A spring is typically used to keep the two parts locked together. The pin slides into the vertical arm of the L, rotates across the horizontal arm, then is biased by the spring such that the pin is no longer free to rotate unless the spring force is overcome.

Figure 14:
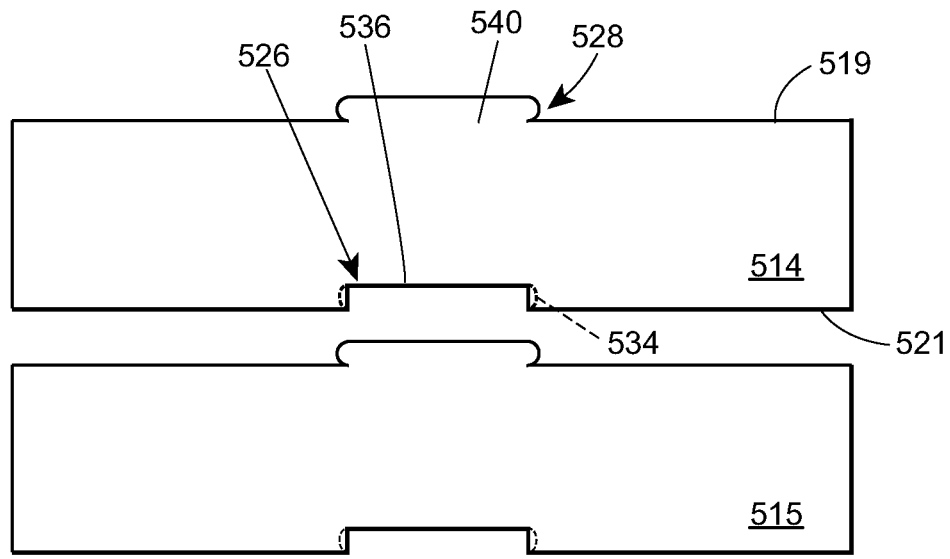
FIG. 14 is a top view illustrating another embodiment of a conveyor belt link according to the disclosure.

FIG. 14 illustrates a top view of another embodiment of a conveyor belt link 514 having a snap or push-fit coupling mechanism. A first link 514 and a second, identical link 515 are not yet coupled for illustrative purposes. The first link 514 has a leading edge 519 with a male part 528 and a trailing edge 521 with a female part 526. The female part 526 forms a notch in the trailing edge 521, the notch generally having a first and second opposing sides 534 and a third side 536 having a greater dimension than the first and second sides 534. The first and second opposing sides 534 of the notch 526 can form a slight curvature within the link itself, but not at the exterior dimensions of the notch. The male part 528 forms a tab 540 having curvature corresponding to the first and second sides 534 of an interior of the notch 526. The curvature of the tab 540 allows the male part 528 to snap into a female part 526 of another link 515. In FIG. 14, the female part 526 of the first link 514 lines up with a tab 540 of a male part 528 of the second link 515. The notch 526 provides a slight clearance to receive the male tab 540. The locking feature of FIG. 14 is only exemplary, and the male/female parts may be alternative snap, or push-fit mechanisms as are known in the art.

Figure 15:
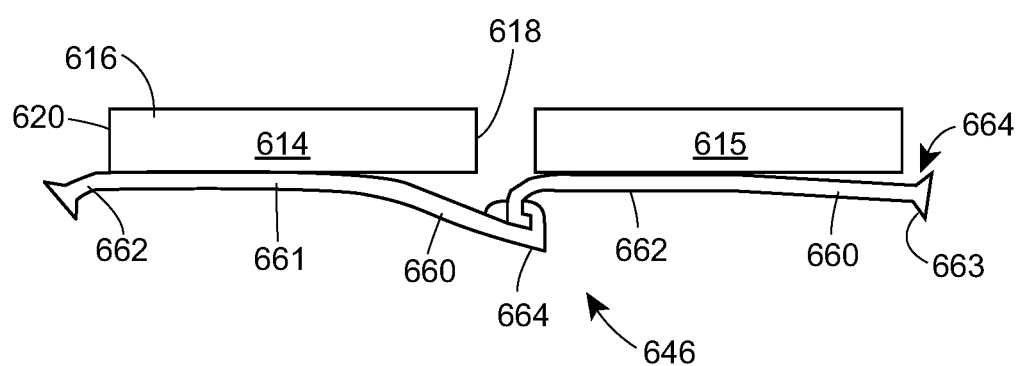
FIG. 15 is a side view illustrating another embodiment of a conveyor belt link according to the disclosure.

FIG. 15 illustrates a side view of a preferred embodiment of a first and second link 614, 615 coupled to form a continuous surface. The first conveyor belt link 614 has a base 616 for carrying an item and the base has first and second opposing sides 618, 620. A first locking tab 660 projects from the first opposing side 618 and a second locking tab 662 projects from the second opposing side 620. The first and second locking tabs 660, 662 can be provided on a bottom surface by a single, unitary structure 661 having two ends, or by separate structure. Illustrated in FIG. 15, the first locking tab 660 of the first link 614 engages and locks with a second locking tab 662 of the second, adjacent link 615. In the illustrated example, each locking tab 660, 662 has a head 663 with first and second gripping edges 664 formed on opposing sides of the head 663. The first and second gripping edges 664 are disposed in opposite directions, with the first gripping edge 664 projecting towards the base 616 and the second gripping edge 664 projecting away from the base 616. The gripping edge 664 of the first locking tab 660 which projects towards the base 616 is configured to mate with a corresponding gripping edge 664 of the second locking tab 662 which projects away from the base 616. When the two links 614, 615 are aligned and pushed together, the first locking tab 660 locks with the second locking tab 662 such that the gripping edge 664 of the first locking tab 660 mates with the gripping edge 664 of the second locking tab 662. The first locking tab 660 is forced away from the base 616 of the first link 614 or biased away by the second locking tab 662, the second locking tab 662 positioned closer to the base 616 of the second link 615. However, in another embodiment not shown, the respective arrangements of the locking tabs 660, 662 may be reversed such that the second locking tab 662 of the second link 615 is biased away from the base 616 by the first locking tab 660 of the first link 614. The locking tab 660, 662 of each link 614, 615 may be a spring shim or a flexible material that is capable of being biased and locking with an identical member.

Figure 16:
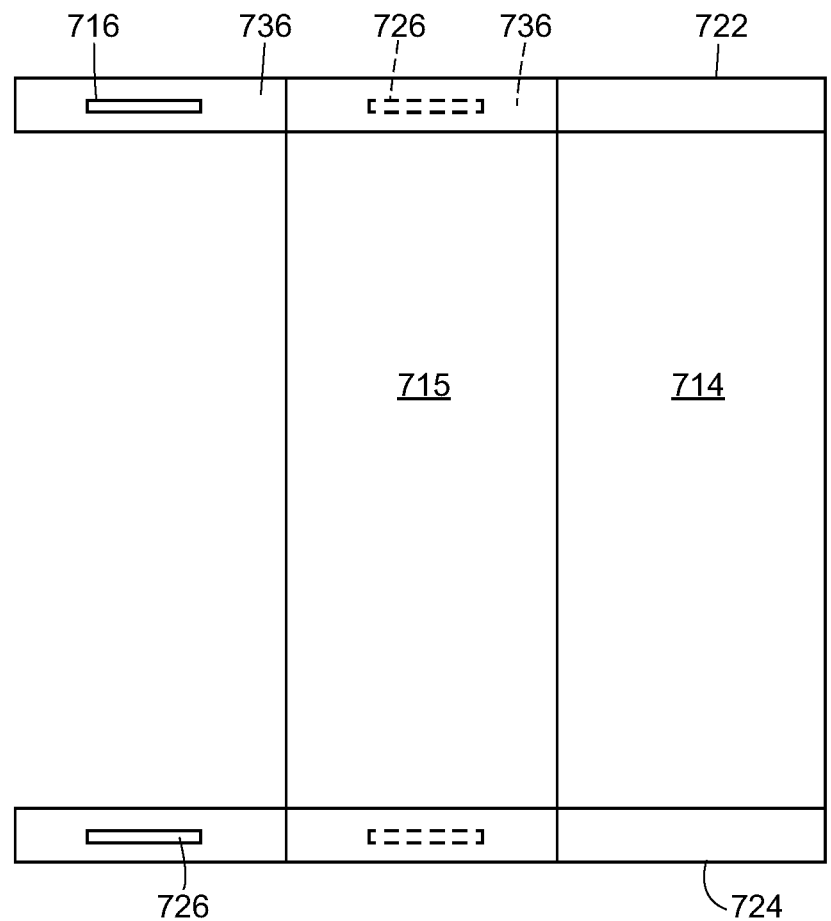
FIG. 16 is a top view illustrating another embodiment of a conveyor belt link according to the disclosure.
Figure 17:
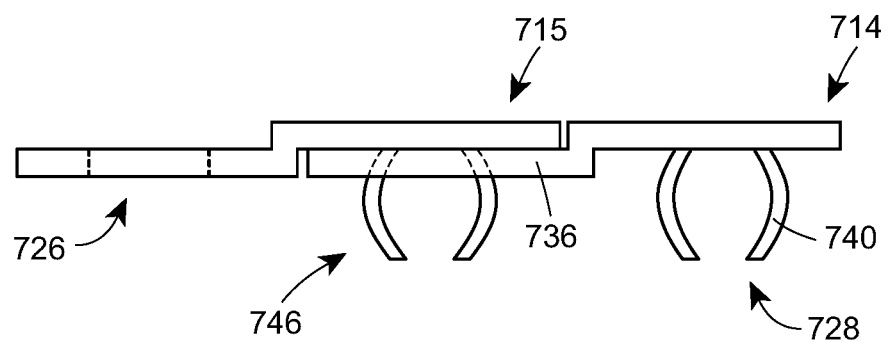
FIG. 17 is a side view further illustrating the conveyor belt link of FIG. 16.

FIG. 16 illustrates a top view of a preferred embodiment of first and second links 714, 715 coupled to form a flat, continuous surface. The first link 714 has a first opposing side at a first side edge of the base 724, and a second opposing side at a second side edge of the base 722. The first and second side edges 722, 724 are substantially parallel to the direction of conveyance travel T of the conveyor belt. In the exemplary embodiment illustrated in FIGS. 16-19, mating features for coupling the first and second links 714, 715 are formed along the first and second side edges 722, 724. Referring back to the conveyor belt link of FIG. 16, the first link 714 has first and second flanges 736 coupled to and disposed below the first and second opposing side edges 722, 724. The flanges 736 are disposed in a step-wise fashion relative to the base 716 of the link 714. The flanges 736 are adapted to receive the base 716 of the second link 715 having the male part 728 located along the side edges 722, 724. Better illustrated in a side view of the coupled links in FIG. 17, the first link 714 comprises a male part 728 along the first and second opposing side edges 722, 724. To couple to another link, the female part 726 of the first link 714 receives the male part 728 of the second link 715 so that the bases 716 of the first and second links 714, 715 are substantially co-planar so as to provide a substantially flat, continuous surface for conveying items. The male part 728 in this embodiment has two flexible arms 740 that are capable of being resiliently biased so as to slide into the female part 726 of the first link 714 to form a coupling 746. Upon entry into the female part, the arms 740 of the male part 728 revert to their original form and bias against the female opening 726, thereby keeping the male and female parts locked.

Figure 18:
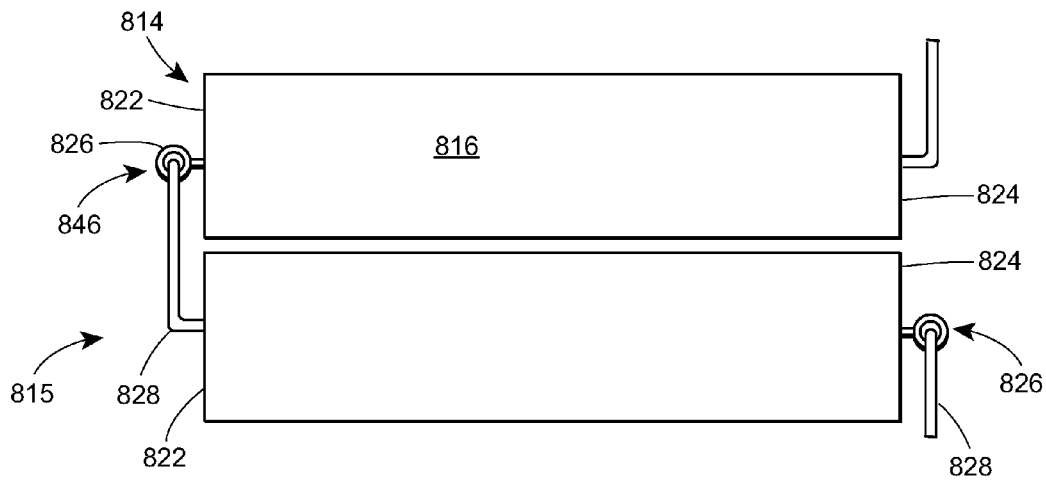
FIG. 18 is a top view illustrating another embodiment of a conveyor belt link according to the disclosure.

Turning now to yet another embodiment, FIG. 18 illustrates a top view of a first link 814 and a second link 815 coupled together to form a continuous flat surface with a hook and loop coupling mechanism 846. The first link 814 includes a base 816 having first and second opposing side edges 822, 824. A female part 826 includes a hoop or similar loop-shaped element at the first opposing side edge 822 and a male part 828 projects from the second opposing side edge 824, the male part 828 being adapted to couple to the hoop element of the female part 826. The second link 815 includes a female part 826 at a second opposing side edge 824 and a male part 828 projecting from a first opposing edge 822. The male part 828 of the second link 815 couples to the female part 826 of the first link 814, the female part 826 of the second link 815 is coupled to a third link (not shown), and the male part 828 of the first link 814 is also coupled to an additional link (not shown). The first and second links 814, 815 in FIG. 18 are identical, but are flipped so that the male and female parts may couple with the corresponding female and male parts of the adjacent links.

Figure 19:
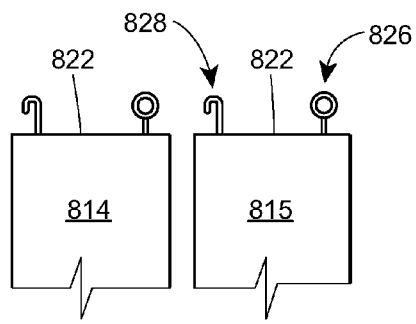
FIG. 19 is a top view illustrating another embodiment of a conveyor belt link according to the disclosure.

In an alternative embodiment shown in FIG. 19, a female 826 and a male part 828 can be provided on the opposing side edges 822, 824 or on the leading and trailing edges of directly adjacent links (not shown). While the embodiments discussed here illustrate a male part 828 having a hook and the female part 826 having a loop structure, any type of female/male mating feature described herein may be suitable for this type of coupling. It should be noted that the mating elements 826, 828 are not shown to scale.

Figure 20:
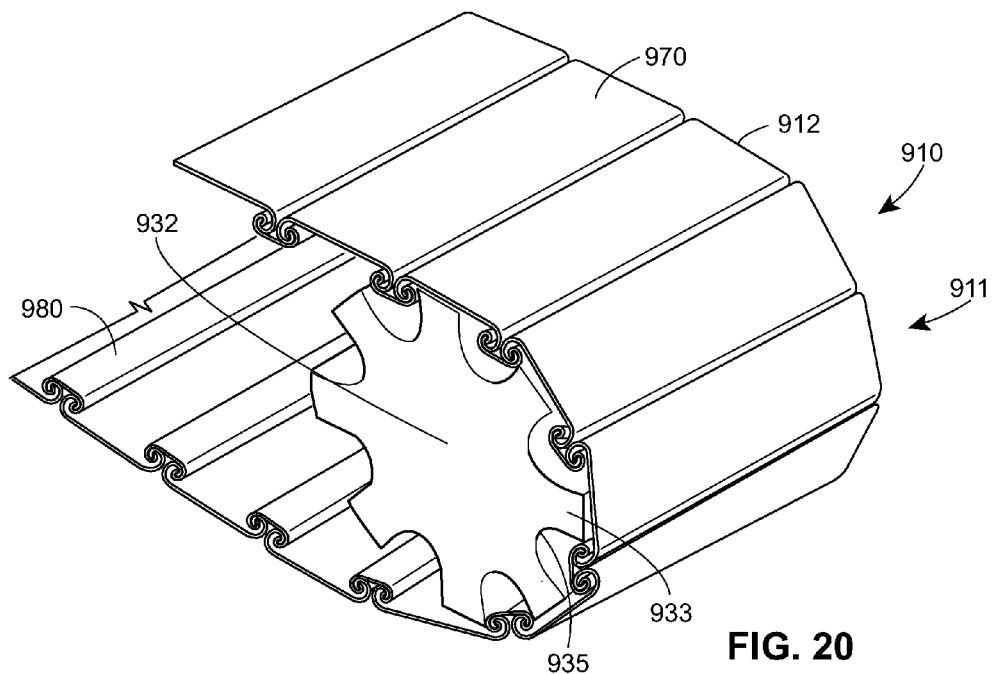
FIG. 20 illustrates a conveyor belt assembly to an embodiment of the disclosure including a plurality of surface links and a plurality of connecting links.
Figure 21:
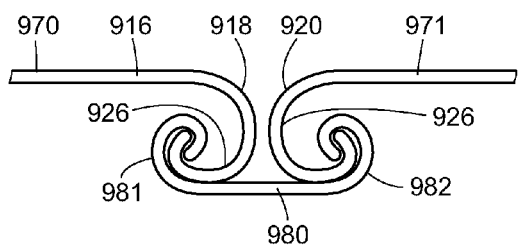
FIG. 21 further illustrates the surface links of FIG. 20.
Figure 22:
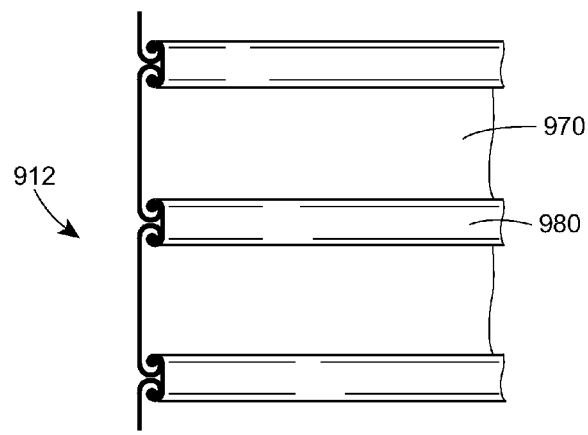
FIG. 22 is a partial, perspective bottom view of the conveyor belt shown in FIG. 20.

Referring now to yet another preferred embodiment illustrated in FIG. 20, a conveyor belt assembly 910 includes a plurality of surface links 970 and a plurality of connecting links 980. Each surface link 970, best illustrated in FIG. 21, has a base 916 for carrying an item, the base having first and second opposing sides 918, 920. A connector part 926 projects from the first opposing side 918 and the second opposing side 920. The connector part 926 projects slightly outward from the base 916 and curves down and back toward the base 916 to form a hook, or a channel. When two surface links 970 are disposed in succession, a connecting link 980 slidingly engage and couple the connector part 926 of the first surface link 970 and the connector part 926 of the second surface link 971. So configured, the connecting link 980 has a first end 981 and a second end 982 with curved ends, forming a curved channel that may slide over the connector links 926. FIG. 22 illustrates a perspective bottom view of a partial conveyor belt 912. The connecting link 980 is rotatably coupled with the connector parts 926 of the adjacent links 970, 971 and provides a drive surface that enables engagement by and rotation about a sprocket 932 or other driving mechanism, as illustrated in FIG. 20.

The conveyor belt links described herein can be manufactured from any suitable material, but is preferably formed from an extrudable material including, but not limited to, extrudable metals, extrudable polymers, and extrudable ceramics. Exemplary extrudable metals include, but are not limited to, aluminum, brass, copper, magnesium, and steel. Aluminum alloys such as hard coated anodized aluminum, for example AA 6063-T6, are preferred. Exemplary extrudable plastics include, but are not limited to, polyvinylchlorides, polyethylenes, polypropylenes, acetals, acrylics, nylons (polyamides), polystyrene, acrylonitrile butadiene styrenes, and polycarbonates. Additionally, the links may be manufactured using a hybrid of materials including metals and rubbers.

In each embodiment, the conveyor belt link is configured to carry items, such as food products, over a distance of a conveyor belt loop. The base of the conveyor belt link can have a top surface that is corrugated or textured (not shown) to grip an item during translational motion. The top surface of the conveyor belt link therefore can include gripping features to retain the item while the item is transported. The gripping features create friction between the conveyor belt link and the item to be conveyed so that the conveyor belt link retains contact with the item during conveyance. The gripping features are typically integrally formed on the top surface of the conveyor belt link and take the shape of a series of parallel rows of sharp ridges and furrows. Of course, similar features can be added post-manufacturing and/or take other geometrical shapes to enhance friction between the top surface and the item to be conveyed. The gripping features allow the top surface to grip on to any kind of surface the item may have, for example, a round or very smooth item that can easily move or slide while being transported. During translational motion, the gripping features hold the item in place over a desired distance such that the item does not slide off or move from the top surface of the conveyor belt link until reaching the end of the conveyor belt loop and being conveyed to a desired location for further use/operation. The gripping features may be integrally formed with the conveyor belt link, but the gripping features may also be manufactured separately and then attached to the top surface of the conveyor belt link. The gripping features may be manufactured from the same or different material as the conveyor belt link. Alternatively, instead of a series of rows of ridges, the gripping features may be provided by a grid of textured pegs. A variety of other geometric shapes can also be used provided that the gripping features enhance friction between the top surface and the item to be conveyed. Other traction examples include, but are not limited to, perforations, bosses or dimples, etching, sanding/grinding, or other gripping features that are formed or molded.

Figure 23:
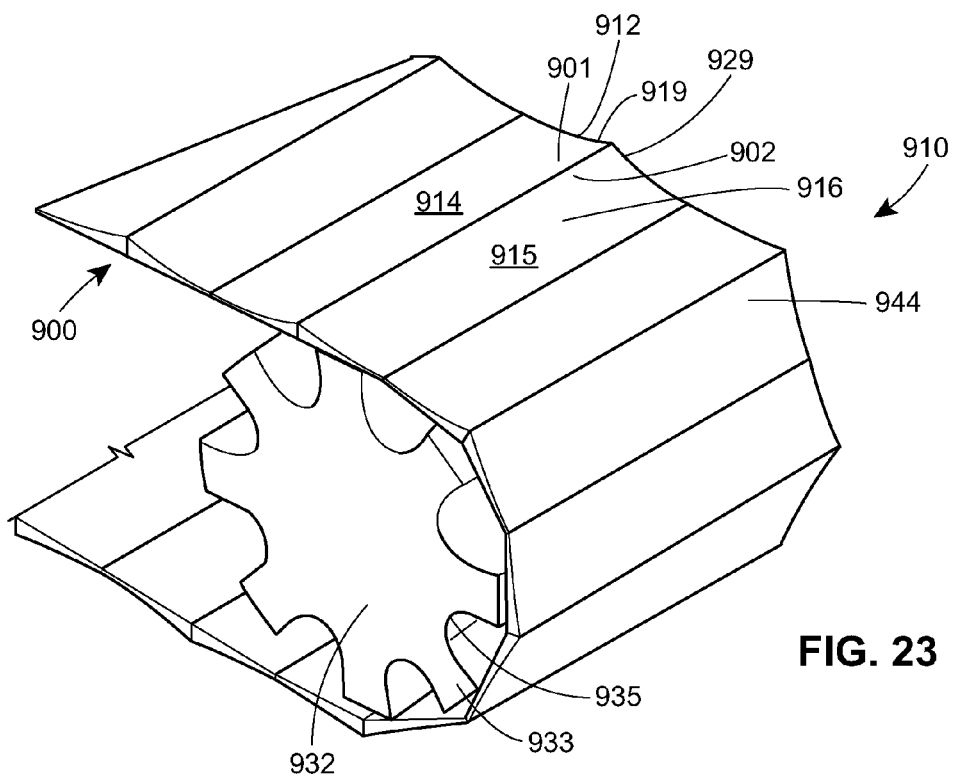
FIG. 23 illustrates a conveyor belt assembly according to the disclosure employing a divider structure to separate or divide the items to be conveyed on the conveyor belt.
Figure 24:
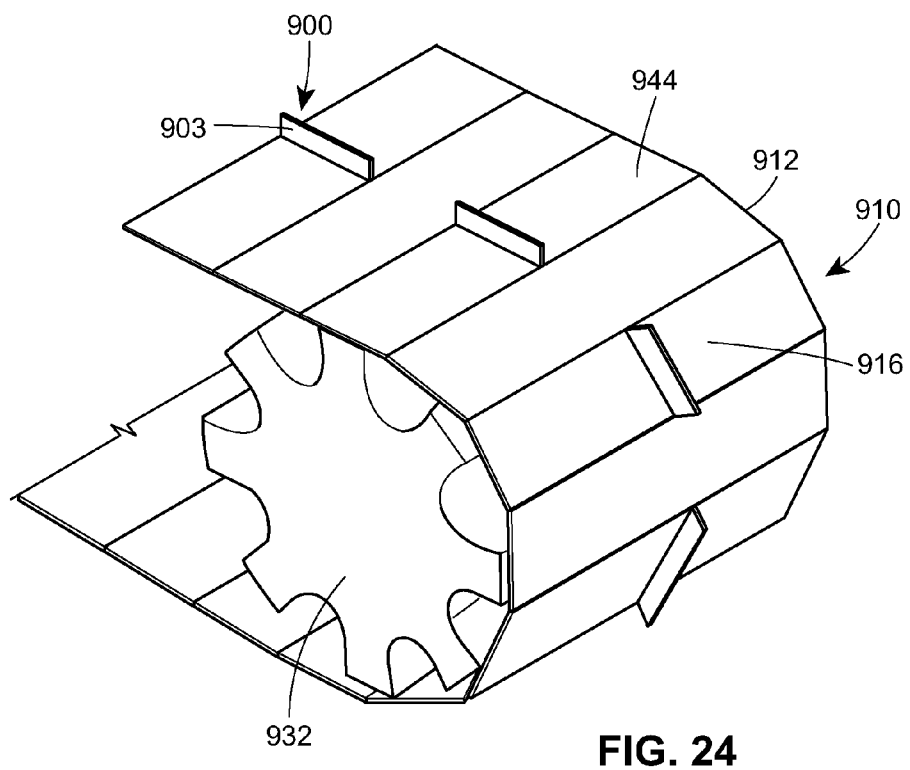
FIG. 24 illustrates a conveyor belt assembly according to the disclosure employing another embodiment of a divider structure.

Turning to FIGS. 23-24, the conveyor belt assembly 910 using any of the embodiments described herein can employ a divider 900 to separate or divide the items to be conveyed, such as food products, on the conveyor belt 912. In the first example, the conveyor belt assembly of FIG. 23 includes a plurality of links 914 that are coupled to form a continuous surface, and a sprocket 932 to drive the conveyor belt 912 into rotational and translational motion. In this illustrated embodiment, the links 914 provide an additional feature to index or divide food products. A first link 914 is rotatably coupled to a second link 915 by any of the coupling mechanisms described above. The first link 914 has a ramp feature 901 on a top surface 944 of the base 916 where the highest point of the ramp feature 901 ends at a leading edge 919 of the first link 914. The second link 915 has a ramp feature 902 on the top surface 944 of the base 916 where the highest point of the ramp feature 902 ends at a trailing edge 921 of the second link 915. The first and second links 914, 915 mate, and thus the ramp feature 901 of the first link 914 and the ramp feature 902 of the second link 915 form a peak 900. Another dividing structure 900 is illustrated in the conveyor belt assembly 910 of FIG. 24. A first link 914 has a barrier wall 903 at a predetermined location on the top surface 944 of the link 914 to divide the link 914 into a first and second compartments. In this illustrated example, every other link has a barrier wall 903 projecting from the base 916 of the link 914, however, this is merely illustrative, and the barrier walls 903 may project from every link or every two links 914, and so on. Although the barrier wall 903 is shown as being disposed across a link base such that it is oriented in a direction substantially parallel to the direction of conveyance travel, the barrier wall 903 may also be disposed along the leading and trailing edges of a link base. The dividing structure 900 may serve to index food product to be conveyed by the toaster. For example, the dividing features may prevent overloading the conveyor belt, or it may be used to index the amount of food product conveyed. The dividers may also prevent the food product from moving or getting moved by other food products on the same conveyor belt assembly.

Referring back to FIG. 6, which illustrates a side view of a partial conveyor belt loop 11 comprising multiple, coupled (or interconnected) conveyor belt links of the conveyor belt link embodiment illustrated in FIG. 5. As previously described, the conveyor belt is formed by successively coupling the male and female parts of each conveyor belt link with the female and male parts of adjacent links. Each conveyor belt link of the conveyor belt is rotatably coupled to its adjacent conveyor belt links. The partial conveyor belt loop 11 depicts the conveyor belt links in a translational phase T and a rotational phase. A complete conveyor loop (not shown) has two translational phases T, both in the center of the loop, and two rotational phases, at the ends of the loop. During the translational phases T, the base of each conveyor belt link mates with the base of its adjacent links to form a substantially flat, substantially continuous, and substantially even surface suitable for conveying items, described above and illustrated in FIG. 1.

Referring back to FIGS. 1 and 20, the partial conveyor belt assembly 10, 910 has a sprocket 32, 932 that drives the conveyor belt 12, 912 of the links described herein. The sprocket 32, 932 has a plurality of teeth 33, 933 and a plurality of furrows 35, 935 between the teeth 33, 933. To drive the conveyor belt 12, 912, the sprocket 32, 932 engages and drives the conveyor belt 12, 912 into rotational and translational motion about a conveyor belt loop 11, 911. The sprocket 32, 932 rotates the conveyor belt 12, 912, for example, when the teeth 33, 933 engage an aperture (not shown) formed within the conveyor belt link 14 and/or when a protruding structure (not shown) engages the furrows 35, 935 and abuts the teeth 33, 933. The protruding structure can be provided, for example, by male components that protrude from a bottom surface of the link.

In one embodiment, devices comprising the conveyor belt assembly according to the disclosure advantageously transport one or more food products in a direction, e.g. horizontally or vertically downward along a heated platen so as to expose the food products to the energy radiating from the platen. Any of the embodiments disclosed herein may be part of a conveyor belt assembly that can be used in many food heating devices, such as toasters, that require one or more conveyor belt assemblies. For example, the conveyor belt assembly can be implemented in a vertically oriented food heating device. A conventional vertical food heating device employs two conveyor belt assemblies, as is generally known in the art, as shown for example in U.S. Pub. No. 2010/0275789, which is incorporated herein by reference in its entirety. A conventional horizontal food heating device is disclosed in U.S. Pat. No. 7,800,023, which is incorporated by reference in its entirety.

Alternatively, the conveyor belt assembly comprising one of the many embodiments of the conveyor belt link may incorporate heat in one or more different ways. The conventional way of heating a food product in a conveyor toaster would be through heated platens, as mentioned above. The conveyor belt assembly described herein may incorporate heating mechanisms to cook or otherwise heat up the food by implementing a heated link. In the case of a heated link, the food being conveyed by the conveyor belt would be treated with heat emanating from the link itself. The heated link may emit heat by absorbing heat after exposure from a heat lamp, or the link may be connected to a power source and use resistive heating to provide heat directly. Additionally, the conveyor belt assembly may incorporate heat through induction, for example, by winding an electromagnet such as iron wire around the top surface of the conveyor belt assembly and passing a high-frequency alternating current (AC) through the electromagnet.

What is claimed is:

1. A conveyor belt, wherein the conveyor belt comprises: a plurality of links, each link comprising a base for carrying an item, a female part, and a male part, the base defined by first and second opposing sides and third and fourth opposing sides substantially perpendicular relative to the first and second opposing sides, the female part formed in at least one of the first opposing side and the third opposing side, and the male part projecting outwardly from at least one of the second opposing side and the fourth opposing side; and wherein the female part is adapted to receive the male part and is coupled to a second link of the plurality of links.

2. The conveyor belt of claim 1, wherein the first opposing side is at least one of a perpendicular leading edge of the base relative to a direction of conveyance travel of the conveyor belt and a perpendicular trailing edge of the base relative to the direction of conveyance travel of the conveyor belt.

3. The conveyor belt of claim 1, wherein the third opposing side is a first side edge of the base, the first side edge being substantially parallel to a direction of conveyance travel of the conveyor belt and the fourth opposing side is a second side edge of the base, the second side edge being substantially parallel to the direction of conveyance travel of the conveyor belt.

4. The conveyor belt of claim 1, wherein the female part comprises an opening element sized to receive a male element of a male part of an adjacent link wherein the male element releasably locks with the opening element.

5. A conveyor belt, wherein the conveyor belt comprises:
a plurality of links, each link comprising a base for carrying an item, the base having a bottom surface, first and second opposing sides, a first locking tab projecting outwardly from the first opposing side, and a second locking tab projecting outwardly from the second opposing side; and
wherein the first locking tab and the second locking tab are disposed on the bottom surface of the base and adapted to engage and lock.

6. The conveyor belt of claim 5, wherein the first and second locking tabs are provided by a single structure.

7. A conveyor belt, wherein the conveyor belt comprises:
a plurality of surface links, each surface link comprising a base for carrying an item, the base having first and second opposing sides and a connector part projecting from each of the first and second opposing sides; and
a plurality of connecting links arranged underneath the bases of the plurality surface links wherein each connecting link is sized to receive the connector part projecting from the first opposing side of a first surface link and the connector part projecting from the second opposing side of a second, adjacent surface link.

8. A conveyor belt, wherein the conveyor belt comprises:
a plurality of links, each link comprising a base for carrying an item, the base having first and second opposing sides, a female part formed in the first opposing side, and a male part projecting from the second opposing side, the female part being adapted to receive the male part and to couple to a second link of the plurality of links; and
wherein the first opposing side is a first side edge of the base, the first side edge being substantially parallel to a direction of conveyance travel of the conveyor belt and the second opposing side is a second side edge of the base, the second side edge being substantially parallel to the direction of conveyance travel of the conveyor belt.

* * * * *